United States Patent
Kotrel et al.

(10) Patent No.: US 8,293,675 B2
(45) Date of Patent: Oct. 23, 2012

(54) PROCESS FOR PRODUCING A CATALYST AND USE OF THE CATALYST

(75) Inventors: Stefan Kotrel, Bedminster, NJ (US); Gerhard Cox, Bad Duerkheim (DE); Ekkehard Schwab, Neustadt (DE); Alexander Panchenko, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 201 days.

(21) Appl. No.: 12/742,026

(22) PCT Filed: Nov. 6, 2008

(86) PCT No.: PCT/EP2008/065039
§ 371 (c)(1),
(2), (4) Date: May 7, 2010

(87) PCT Pub. No.: WO2009/060019
PCT Pub. Date: May 14, 2009

(65) Prior Publication Data
US 2010/0267551 A1   Oct. 21, 2010

(30) Foreign Application Priority Data
Nov. 9, 2007 (EP) .................................. 07120359

(51) Int. Cl.
H01M 4/88 (2006.01)
H01M 4/02 (2006.01)
H01M 4/36 (2006.01)
H01M 4/90 (2006.01)
H01M 4/92 (2006.01)
H01M 4/94 (2006.01)
B01J 31/00 (2006.01)
B01J 21/18 (2006.01)
B01J 23/00 (2006.01)
B01J 23/40 (2006.01)
B01J 23/74 (2006.01)

(52) U.S. Cl. ........ 502/185; 502/101; 502/150; 502/151; 502/161; 502/173; 429/523; 429/524; 429/525; 429/526; 429/527

(58) Field of Classification Search .................. 502/101, 502/150, 161, 173, 182, 185, 151; 429/523–527
See application file for complete search history.

(56) References Cited

U.S. PATENT DOCUMENTS

| 5,068,214 A * | 11/1991 | Cordier et al. ............... 502/185 |
| 5,916,702 A | 6/1999 | Marucchi-Soos et al. |
| 7,157,401 B2 * | 1/2007 | Purta et al. .................... 502/180 |
| 7,396,797 B2 * | 7/2008 | Tsutsumi et al. ............. 502/185 |
| 2004/0101718 A1 | 5/2004 | Cao et al. |
| 2004/0161641 A1 | 8/2004 | Lee et al. |
| 2005/0221975 A1 | 10/2005 | Renock et al. |
| 2005/0235776 A1 | 10/2005 | He et al. |

FOREIGN PATENT DOCUMENTS

| EP | 0 899 348 | 3/1999 |
| WO | 2005 069893 | 8/2005 |

OTHER PUBLICATIONS

"Novel Pt-Ru nanoparticles formed by vapour deposition as efficient electrocatalyst for methanol oxidation Part I. Preparation and physical characterization," Pasupathi Sivakumar et al. Electrochimica Acta 50 (2005), pp. 332-3319.*
"Oxygen Reduction Activity of Carbon-Supported Pt-M (M = V, Ni, Cr, Co, and Fe) Alloys Prepared by Nanocapsule Method," Hiroshi Yano et al. Langmuir 2007, 23, pp. 6438-6445.*
"An organometallic depostion of ruthenium adatoms on platinum that self poisons at a specific surface composition. A direct methanol fuel cell using a platinum-ruthenium adatom anode catalyst," Dianxue Cao et al. Journal of Electroanalytical Chemistry 533 (2002), pp. 91-100.*
"Activity analysis of a water oxidation catalyst adsorbed on an inorganic particle matrix," Isamu Ogino et al. J. Chem. Soc., Faraday Trans., 1996, 92(18), pp. 3431-3434.*
U.S. Appl. No. 12/674,909, filed Feb. 24, 2010, Kotrel, et al.
U.S. Appl. No. 13/320,384, filed Nov. 14, 2011, Koenigsmann, et al.
U.S. Appl. No. 13/260,053, filed Sep. 23, 2011, Coelho Tsou, et al.
U.S. Appl. No. 13/061,040, filed Feb. 25, 2011, Schwab, et al.
U.S. Appl. No. 13/375,805, filed Dec. 2, 2011, Schwab, et al.

* cited by examiner

Primary Examiner — Patricia L Hailey
(74) Attorney, Agent, or Firm — Oblon, Spivak, McClelland, Maier & Neustadt, L.L.P.

(57) ABSTRACT

The invention relates to a process for producing a catalyst comprising a metal of the platinum group and a second metal selected from among the metals of the platinum group or the transition metals, in which a catalyst comprising the metal of the platinum group is mixed with a complex comprising the second metal to give a dry powder in a first step and the powder is subsequently heat treated to form a compound between the metal of the platinum group and the second metal. The invention further relates to the use of the catalyst produced according to the invention.

20 Claims, No Drawings

PROCESS FOR PRODUCING A CATALYST AND USE OF THE CATALYST

The invention relates to a process for producing a catalyst comprising a metal of the platinum group and a second metal selected from among the metals of the platinum group or the transition metals. The invention further relates to a use of the catalyst produced according to the invention.

Catalysts which comprise an alloy of at least two different metals, of which at least one metal is a metal of the platinum group, are used, for example, as electrocatalysts in fuel cells. In particular, such catalysts are suitable for use as cathode catalyst in direct methanol fuel cells (DMFCs). Apart from a high current density for the reduction of oxygen, cathode catalysts in DMFCs have to meet further requirements. Since passage of methanol through a membrane used as separator in principle allows the catalytic oxidation of methanol by means of oxygen at the cathode, it is necessary for the cathode catalyst used to be as inactive as possible in respect of the oxidation of methanol. This means that it has to have a high selectivity for the reduction of oxygen over the oxidation of methanol.

Heat-treated transition metal-porphyrin complexes as are known, for example, from J. Applied Electrochemistry (1998), pages 673-682, or transition metal sulfides, for example ReRuS or MoRuS systems, as are known, for example, from J. Electrochem. Soc., 145 (10), 1998, pages 3463-3471, display, for example, a high current density for the reduction of oxygen and a good tolerance to methanol. However, these catalysts do not achieve the activity of Pt-based catalysts and are also not stable enough to ensure a satisfactory current density in the acid medium of a fuel cell over a prolonged period.

It is known from US-A 2004/0161641 that Pt catalysts which are alloyed with transition metals display a good methanol tolerance and ensure a sufficiently high current density for the reduction of oxygen. Thus, US-A 2004/0161641 discloses, for example, that an active methanol-tolerant cathode catalyst should have a very high oxygen binding energy combined with a low hydrogen binding energy. A high oxygen binding energy ensures a high current density for the reduction of oxygen while a low hydrogen binding energy damps the electrooxidative dehydrogenation of methanol to form carbon monoxide and thus increases the methanol tolerance. These properties are displayed, according to US-A 2004/0161641, by alloys of the elements Fe, Co, Ni, Rh, Pd, Pt, Cu, Ag, Au, Zn and Cd. However, a specific example of an alloy composition suitable as methanol-tolerant cathode catalyst is not given.

As an alternative to the use of a methanol-tolerant catalyst, Platinum Metals Rev. 2002, 46, (4) for example, mentions the possibility of reducing permeation of methanol by choice of a more suitable membrane. For this purpose, it is possible to use, for example, thicker Nafion membranes. However, the lower methanol permeation simultaneously leads to an increase in the membrane resistance, which ultimately leads to reduced power output of the fuel cell.

The production of catalysts comprising platinum and ruthenium is known, for example, from A. J. Dickinson et al., "Preparation of a Pt—Ru/C Catalyst from carbonyl complexes for fuel cell applications", Elektrochimica Acta 47 (2002), pages 3733-3739. For this purpose, $[Ru_3(CO)_{12}]$ and $[Pt(CO)_2]_x$ and activated carbon are mixed with o-xylene. This mixture was heated under reflux at 143° C. with constant mechanical stirring for 24 hours. The mixture was subsequently cooled and the o-xylene was removed by distillation. The heating under reflux was carried out under an air atmosphere. The process described leads to a catalyst which is rich in ruthenium.

An overview of the preparative techniques for producing Pt—Ru catalysts for use in direct methanol fuel cells is given by H. Liu et al., "A review of anode catalysis in the direct methanol fuel cell", Journal of Power Sources, 155 (2006) pages 95-110. The impregnation of carbon supports with metal-comprising precursors, the application of colloidal metal alloy particles to supports and the synthesis of finely divided metal particles in microemulsions are described as suitable production processes. The application of colloidal metal alloy particles to supports and the synthesis of finely divided metal particles in microemulsions require the use of very costly starting materials, e.g. surfactants. For this reason, the impregnation of carbon supports is most frequently used for producing catalysts. However, a disadvantage of impregnation is that it is generally difficult to control the size of the nanoparticles and their distribution. In addition, the use of high-boiling solvents, as frequently occurs in impregnation, is problematical, in particular in the production of industrially relevant quantities of catalyst.

In a further known process, a platinum catalyst is firstly prepared in a first step. This is filtered, washed and dried and then redispersed in a liquid reaction medium, generally water. The element to be alloyed in is then added in the form of a suitable soluble salt to the dispersion and precipitated by means of a suitable precipitate, preferably sodium carbonate. The dispersion obtained is filtered, the solid separated off is washed, dried and subsequently subjected to a high-temperature treatment under a reducing atmosphere. However, this process has the disadvantage that a product which has already been filtered, washed and dried once has to be subjected to this sequence of processing steps a second time.

It is therefore an object of the present invention to provide a process for producing a catalyst, which does not have the disadvantages of the processes known from the prior art. In particular, it is an object of the present invention to provide a process by means of which a catalyst having a reproducible size and distribution of nanoparticles can be produced and in which the same wet-chemical process steps do not have to be carried out in two successive process steps.

This object is achieved by a process for producing a catalyst comprising a metal of the platinum group and a second metal selected from among the metals of the platinum group or the transition metals, which comprises the following steps:

(a) mixing of a catalyst comprising the metal of the platinum group with a complex comprising the second metal to give a dry powder, (b) heat treatment of the powder to form a compound between the metal of the platinum group and the second metal.

The compound formed by the heat treatment in step (b) is generally an alloy.

The mixing of the catalyst comprising the metal of the platinum group with the complex comprising the second metal to give a dry powder in step (a) avoids the need for the already washed and dried catalyst comprising the metal of the platinum group to be filtered, washed and dried again. Only the high-temperature treatment in step (b) is required to obtain the alloy.

The catalyst comprising the metal of the platinum group is, in a first embodiment, a pure metal which is present in powder form. In an alternative embodiment, the catalyst comprising the metal of the platinum group is present in supported form. The support used here is generally a catalytically inactive material onto which the catalytically active material has been applied or which comprises the catalytically active material.

For the purposes of the invention, metals of the platinum group are rhodium, iridium, nickel, palladium, platinum, copper, silver, gold. In a preferred embodiment of the invention, however, the metal of the platinum group is platinum.

If the catalyst used in step (a) is in unsupported form, the metal of the platinum group is preferably in the form of powder having a particle size in the range from 1 to 200 µm. In this case, the metal of the platinum group has primary particle sizes in the range from 2 to 20 nm. However, the powder of the metal of the platinum group can also comprise further, catalytically inactive constituents. These serve, for example, as separation agents. Materials suitable for this purpose are, for example, all materials which could also be used as catalyst supports.

If the catalyst comprising the metal of the platinum group which is used in step (a) is supported, carbon is generally used as support. The carbon can be present as, for example, activated carbon, carbon black or nanostructured carbon. Suitable carbon blacks are, for example, Vulcan XC72 and Ketjen Black EC300. If the carbon is in the form of nanostructured carbon, preference is given to using carbon nanotubes. To produce the catalyst, the metal of the platinum group is joined to the support material. The production of such supported or unsupported catalysts comprising a metal of the platinum group is known and such catalysts are commercially available.

The second metal which is present in the complex, preferably a metal-organic complex, and is selected from among the metals of the platinum group or the transition metals is preferably selected from the group consisting of ruthenium, cobalt, nickel and palladium.

The second metal is preferably in the form of a metal-organic complex. Preferred ligands for forming the metal-organic complex are olefins, preferably dimethyloctadiene, aromatics, preferably pyridine, 2,4-pentanedione. Preference is also given to the second metal being in the form of a mixed cyclopentadienyl-carbonyl complex or in the form of a pure or mixed carbonyl, phosphane, cyano or isocyano complex. Particular preference is given to the second metal being in the form of a metal-organic complex with acetylacetonate or 2,4-pentanedione as ligand. The second metal is in this case preferably in ionic form.

To mix the second metal selected from among the metals of the platinum group or the transition metals with the catalyst comprising the metal of the platinum group, it is preferred that the complex comprising the second metal is present in dry form. However, as an alternative, it is also possible for the complex to be present as a solution in a solvent. The solvent here is preferably selected from the group consisting of hexane, cyclohexane, toluene and ether compounds. Preferred ether compounds are open-chain ethers, for example diethyl ether, di-n-propyl ether or 2-methoxypropane, and also cyclic ethers such as tetrahydrofuran or 1,4-dioxane.

If the complex comprising the second metal is present as a solution in a solvent, the mixture of the catalyst comprising the metal of the platinum group and the metal-organic compound or the metal complex is dried before the heat treatment in step (b). Drying can be carried out at ambient temperature or at elevated temperature. If drying is carried out at elevated temperature, the temperature is preferably above the boiling point of the solvent. The drying time is selected so that the proportion of solvents in the mixture of the catalyst comprising the metal of the platinum group and the complex after drying is less than 5% by weight, preferably less than 2% by weight.

The mixing of the catalyst comprising the metal of the platinum group and the complex comprising the second metal is carried out by any method known to those skilled in the art for the mixing of solids. Suitable solids mixers usually comprise a vessel in which the material to be mixed is moved. Suitable solids mixers are, for example, paddle mixers, screw mixers, hopper mixers or pneumatic mixers.

If the complex is present as a solution in a solvent, the mixture of the catalyst comprising the metal of the platinum group and the dissolved complex is preferably prepared by a customary dispersion method known to those skilled in the art. Here, use is made of, for example, a vessel in which fast-rotating knives or blades are comprised. An example of such an apparatus is an Ultra-Turrax®.

To form a compound between the metal of the platinum group and the second metal selected from among the metals of the platinum group or the transition metals, the powder produced by mixing in step (a) is heat treated. The heat treatment is preferably carried out in at least two steps at different temperatures, with the temperature being increased from step to step.

As a result of the heat treatment, the complex is decomposed and the metal bound therein is set free. The metal combines with the metal of the platinum group. This forms an alloy in which metal crystallites are present side-by-side in a disordered fashion. The individual metal crystallites generally have a size in the range from 2 to 7 nm.

In a preferred embodiment, the heat treatment is carried out in three steps, with the first step being carried out at an essentially constant temperature in the range from 90 to 140° C., preferably in the range from 100 to 110° C., for a time of from 90 to 180 minutes, preferably a time in the range from 100 to 150 minutes. The second step is carried out at an essentially constant temperature in the range from 300 to 350° C. for a time of from 3 to 5 hours, preferably a time in the range from 3.5 to 4.5 hours. The temperature at which the second step is carried out depends on the second metal used. If, for example, cobalt is used as second metal, the second step is preferably carried out at a temperature in the range from 200 to 240° C., preferably at about 210° C. If ruthenium is used as second metal, the second step is preferably carried out at a temperature in the range from 290 to 310° C., preferably at about 300° C.

The third step is preferably carried out at an essentially constant temperature in the range from 500 to 800° C. for a time in the range from 20 minutes to 4 hours. The temperature and the duration of the third step are once again dependent on the second metal used. Thus, for example, when cobalt is used as second metal, the third step is carried out at a temperature in the range from 580 to 620° C. for a time of from 2.5 to 3.5 hours. The third step is preferably carried out at a temperature of about 600° C. for about 3 hours. On the other hand, when ruthenium is used, the third step is carried out at a temperature in the range from 680 to 720° C. for a time of from 20 to 40 minutes. As metal of the platinum group, platinum is used in each case.

The temperature is preferably increased linearly between the individual steps. The temperature increase from the first step to the second step preferably takes place within 20-60 minutes and the temperature increase from the second step to the third step takes place within 2-4 hours, preferably within 2.5-3.5 hours.

The first step of the heat treatment process is preferably carried out under an inert atmosphere. The inert atmosphere is preferably a nitrogen atmosphere. However, it is also possible, as an alternative, for argon, for example, to be used instead of nitrogen. It is also possible to use a mixture of nitrogen and argon. However, preference is given to nitrogen.

The at least one step following the first step is preferably carried out under a reducing atmosphere. The reducing atmosphere preferably comprises hydrogen. The proportion of hydrogen is dependent on the composition of the catalyst produced. Thus, for example, in the case of a Pt—Ru catalyst in a 3-stage heat treatment process, the second step is preferably carried out under an atmosphere comprising essentially equal parts of hydrogen and nitrogen. However, the third step of the heat treatment process is carried out under an atmosphere in which hydrogen and nitrogen are preferably present in a ratio of 1:9.

On the other hand, both the second and third heat treatment steps in the production of a Pt—Ru catalyst using a 3-staged heat treatment process are preferably carried out under an atmosphere in which hydrogen and nitrogen are present in a ratio of 2:1.

After conclusion of the heat treatment in step (b), the product is preferably cooled to ambient temperature under an inert atmosphere. The inert atmosphere is likewise, as described above, preferably a nitrogen atmosphere or an argon atmosphere. It is also possible to use a mixture of nitrogen and argon.

In the production of a Pt—Co catalyst, excess cobalt which is not stable to acid is preferably removed after cooling. For this purpose, the thermally treated catalyst is preferably slurried in sulfuric acid and stirred under a nitrogen atmosphere. Preference is given to using from 0 to 1 M, preferably from 0.4 to 0.6 M, sulfuric acid for slurrying. The temperature is in the range from 60 to 100° C., preferably from 85 to 95° C. The duration of the acid treatment is preferably in the range from 30 to 90 minutes, more preferably from 50 to 70 minutes. After slurrying with the sulfuric acid, the catalyst is washed, filtered and dried. Drying is preferably carried out under reduced pressure.

The catalyst produced according to the invention is stable to acids and displays a high current density for the reduction of oxygen, as is desirable in direct methanol fuel cells. In addition, the catalyst produced according to the invention is also very tolerant toward methanol contamination.

To achieve a sufficiently good catalytic activity, it is necessary for the catalyst to have a large specific surface area. This is preferably achieved by the catalyst comprising a support to which the alloy of the metal of the platinum group and the second metal has been applied. To achieve a large surface area, the support is preferably porous.

When the catalyst has been applied to the support, individual particles of the catalyst material are generally comprised on the support surface. The catalyst is usually not present as a contiguous layer on the support surface.

Suitable supports are, for example, ceramics or carbon. A particularly preferred support material is carbon. The advantage of carbon as support material is that it is electrically conductive. If the catalyst is used as electrocatalyst in a fuel cell, e.g. as cathode of the fuel cell, it is necessary for it to be electrically conductive in order to ensure the function of the fuel cell.

Apart from carbon, further suitable support materials are, for example, tin oxide, preferably semiconducting tin oxide, γ-aluminum oxide which may be carbon coated, titanium dioxide, zirconium dioxide, silicon dioxide, with the latter preferably being present in finely divided form in which the primary particles have a diameter of 50-200 nm.

Further suitable support materials are also tungsten oxide and molybdenum oxide, which may also be in the form of bronzes, i.e. substoichiometric oxide. Carbides and nitrides of metals of transition groups IV to VII of the Periodic Table of the Elements, preferably of tungsten and of molybdenum, are also suitable.

When carbon is used as material for the support, it is preferably in the form of carbon black or graphite. As an alternative, the carbon can also be in the form of activated carbon or nanostructured carbon. An example of nanostructured carbons is carbon nanotubes.

If the catalyst comprising the metal of the platinum group further comprises a support, the metal of the platinum group is usually deposited on the support first. This is generally carried out in solution. For this purpose, metal compounds, for example, can have been dissolved in a solvent. The metal can be covalently, ionically or coordinatively bound. Furthermore, it is also possible for the metal to be deposited reductively, as precursor or under alkaline conditions by precipitation of the corresponding hydroxide. Further possibilities for depositing the metal of the platinum group are impregnation with a solution comprising the metal (incipient wetness), chemical vapor deposition (CVD) or physical vapor deposition (PVD) and also all further processes known to those skilled in the art by means of which a metal can be deposited. A salt of the metal of the platinum group is preferably precipitated first. After precipitation, the product is dried and heat treated to produce the catalyst comprising the metal of the platinum group.

The catalyst produced by the process of the invention is suitable, for example, for use as electrode material in a fuel cell. Further suitable fields of use are the electrooxidation of methanol or hydrogen outside a fuel cell, the electroreduction of oxygen, chloralkali electrolysis and electrolysis of water. The catalyst produced by the process of the invention can also be used, for example, in automobile exhaust gas catalysis, for example as 3-way catalyst or diesel oxidation catalyst, or for catalytic hydrogenation or dehydrogenation in the chemical industry. Such hydrogenation and dehydrogenation reactions are, for example, hydrogenations of unsaturated aliphatic, aromatic and heterocyclic compounds, dehydrogenation of carbonyl, nitrile, nitro groups and of carboxylic acids and esters thereof, aminative hydrogenations, hydrogenations of mineral oils and carbon monoxide. Examples of dehydrogenations are the dehydrogenation of paraffins, of naphthenes, of alkylaromatics and of alcohols. The hydrogenation or dehydrogenation can be carried out either in the gas phase or in the liquid phase.

In a particularly preferred embodiment, the catalyst produced by the process of the invention is used for an electrode in a direct methanol fuel cell. The electrode for which the catalyst is used is, in particular, a cathode of the direct methanol fuel cell. When the catalyst produced by the process of the invention is used as cathode in a direct methanol fuel cell, it displays a sufficiently high current density for the reduction of oxygen. In addition, the catalyst produced by the process of the invention is tolerant toward methanol contamination. This means that the catalyst produced by the process of the invention is generally inactive in respect of the oxidation of methanol.

EXAMPLES

Comparative Example a) Production of a Supported Platinum Catalyst 75 g of carbon black EC300J and 3.5 l of water were placed in a vessel, homogenized by means of an Ultra-Turrax T25 at 110 000 rpm for 2 minutes and subsequently stirred by means of an IKA stirrer provided with a double stirrer for 30 minutes. 130 g of Pt(NO$_3$)$_2$ were subsequently dissolved in 1.5 l of water and mixed with 5 l of ethanol. This solution was combined with the carbon black suspension to produce a reaction mixture. The reaction mixture was subsequently stirred at room temperature for 30 minutes and then refluxed for 5 hours. The Pt/C formed was filtered off and washed free of nitrate with 242 l of water over a period of 16 hours. It was finally dried at 100° C. for 54 hours under a nitrogen atmosphere in a rotary tube furnace through which nitrogen was passed at a flow rate of 50 l/h.

b) Production of a Mixture of Platinum and Cobalt on Carbon (PtCo/C)

16 g of the Pt/C material produced above and 1.5 l of water were placed in a vessel and stirred for 30 minutes. 20 g of Co(NO$_3$)$_2$*6H$_2$O dissolved in 50 ml of water were subsequently added. The pH of this mixture is kept constant at 5.6 by addition of a 5% strength sodium carbonate solution. After addition of the Co(NO$_3$)$_2$, the mixture was stirred at 60° C. for one hour with air being passed through the mixture, resulting in the pH dropping to 4.3. After one hour, the pH was set to 7.5 by means of a 5% strength sodium carbonate solution. The PtCo/C was subsequently filtered off and washed free of nitrate with 12 l of water. It was then dried at 100° C. for 16 hours under a nitrogen atmosphere in a rotary tube furnace through which 50 l/h of nitrogen was passed.

4 g of the PtCo/C material were brought to 600° C. over a period of 3 hours in a rotary tube furnace and maintained at this temperature for 3 hours. During this heat treatment, the sample was flushed with 5 l/h of nitrogen and 10 l/h of hydrogen, with the nitrogen and hydrogen being introduced simultaneously. After the heat treatment, the sample was passivated at room temperature using 15 l/h of N$_2$ and 3 l/h of air. For this purpose, the rotary tube furnace was firstly flooded with pure nitrogen to remove hydrogen completely from the furnace and air was subsequently added to the nitrogen.

To remove excess Co which is not stable to acid, the thermally treated catalyst was subsequently slurried with 0.5 M H$_2$SO$_4$ and stirred at 90° C. for one hour under nitrogen. The catalyst was subsequently filtered off with suction and dried under reduced pressure.

The catalyst produced in this way comprises 52% by weight of platinum, 18.2% by weight of cobalt. The crystallite size was determined by X-ray diffraction. A crystallite size of 4.2 nm was measured.

Production Example 1

8 grams of a platinum catalyst produced as described in comparative example a) were mixed dry with 8.9 grams of cobalt diacetylacetonate. The mixture was introduced into a rotary tube furnace which can be operated under a nitrogen or hydrogen atmosphere. The heat treatment was carried out in three steps. In the first step, the mixture was maintained at 110° C. under a nitrogen atmosphere for 2 hours. The temperature was subsequently increased to 210° C. over a period of 30 minutes. The temperature was subsequently held at 210° C. for 4 hours. A mixture of nitrogen and hydrogen in a ratio of 1:2 was used as gas atmosphere. To continue the treatment, the temperature was increased from 210° C. to 600° C. over a period of 3 hours and then held at this temperature for a further 3 hours. The gas atmosphere continued to be composed of nitrogen and hydrogen in a ratio of 1:2. After the 3 hours at a temperature of 600° C. had elapsed, the product was cooled under a nitrogen atmosphere. As soon as room temperature had been reached, the atmosphere was changed over to air. No temperature increase in the product was observed here.

To remove excess and unreacted cobalt which is not stable to acid, the catalyst was subjected to washing with 0.5 molar H$_2$SO$_4$ at a temperature of 90° C. for one hour. The catalyst was subsequently washed, filtered and dried. The catalyst produced in this way has a platinum content of 48.4% by weight and a cobalt content of 21.2% by weight and the crystallite size determined by X-ray diffraction was 3.1 nm.

Production Example 2

4 grams of the platinum catalyst produced as described under step a) in the comparative example were mixed with 4.7 grams of ruthenium triacetylacetonate. The mixture was introduced into a rotary tube furnace which can be operated under a nitrogen or hydrogen atmosphere and subjected to the following treatment:

The mixture was firstly maintained at a temperature of 110° C. under a nitrogen atmosphere for 2 hours. The temperature was subsequently increased to 300° C. over a period of 30 minutes. The mixture was then maintained at this temperature for 4 hours. The gas atmosphere used was a mixture of hydrogen and nitrogen in a ratio of 1:1. The gas atmosphere was subsequently changed to a ratio of hydrogen to nitrogen of 1:9. The temperature was increased to 700° C. over a period of 3 hours and then maintained at 700° C. for 30 minutes. This was followed by cooling under a nitrogen atmosphere.

After cooling, the catalyst was passivated by treatment, in each case for 30 minutes, firstly with 0.1% of oxygen, then with 0.5% of oxygen, with 1% of oxygen and with 5% of oxygen, in each case in nitrogen, before being removed from the furnace. The catalyst produced in this way comprises 37% by weight of ruthenium, 23% by weight of cobalt. The crystallite size is 3.3 nm and the lattice constant (XRD) is 0.386 nm. It was found by means of transmission electron microscopy that the platinum-ruthenium metal alloy was deposited uniformly and in finely divided form on the carbon black support. The particle size of the individual metal particles is in the range 1-10 nm.

Assessment of the Methanol Tolerance

The catalysts produced as described in the comparative example and production example 1 were processed to produce an ink. For this purpose, 6 mg of catalyst, 1 g of H$_2$O, 0.1 g of 5 percent strength Nafion solution (in an alcohol/water mixture) and 7.07 g of isopropanol were mixed. The experiments were carried out on an annular disc electrode in a 3-electrode arrangement with a calomel reference electrode. Coating was carried out by applying 200 μl of the ink in 20 μl portions to the measuring head over an area of 100 mm$^2$ and drying it by means of a hair dryer. The experiments were carried out at 70° C. in 1 molar sulfuric acid. Before commencement of the measurement, the electrolyte was saturated with oxygen for one hour. To bring the catalyst layers to a defined initial state, 2 cyclovoltammetric scans from −150 mV to 850 mV and back to −150 mV relative to calomel were carried out at an advance rate of 50 mV/s and a rotation speed of 600 rpm before the actual measurement. For the actual measurement, the electrode potential of the working electrode was kept constant at 500 mV relative to the calomel electrode and the cathode current was recorded as a function of time. The average current density standardized to the noble metal content from 1700 to 1710 seconds after commencement of the experiment served as measure of the current density for the reduction of oxygen over the catalysts examined. To examine the influence of methanol, the experiment was firstly carried out in a pure sulfuric acid electrolyte and subsequently in a methanol-containing electrolyte which was 3 mM in methanol.

In the case of the catalyst produced as described in the comparative example, a current density for the reduction of oxygen without MeOH of 34.7 mA/mg of Pt was obtained, and the current density for the reduction of oxygen in the presence of methanol was 32.3 mA/mg of Pt. In the case of the catalyst produced as described in production example 1, a current density for the reduction of oxygen of 39.7 mA/mg of Pt was obtained without methanol and the current density for the reduction of oxygen in the presence of methanol was 32.3 mA/mg of Pt. It can be seen that the current densities for the catalyst produced according to the invention are greater than for the catalyst produced according to the prior art.

Methanol Activity Test

To test the platinum-ruthenium catalyst produced as described in example 2 for the electrochemical oxidation of methanol, an ink was firstly produced from 80 mg of catalyst. For this purpose, the catalyst was admixed with 2 g of water and 2 g of 5 percent strength Nafion solution in ethanol and processed in an ultrasonic bath with addition of a few 3 mm glass beads for one hour to give a homogeneous suspension. The catalyst-comprising ink was then applied to the measuring head of a rotating disc electrode and dried in an unheated stream of air. From 100 to 150 µg of catalyst were applied dry during coating of the disc electrode. The precise amount of catalyst was determined by reweighing the disc electrode.

The measurement was carried out using a 3-electrode arrangement comprising a working electrode, a counterelectrode and a reference electrode. The potentiostatic measurement was carried out using an instrument from Jaissle (PGU 10V-1A-E). The electrolyte used was 1 M $H_2SO_4$ which was maintained at 60° C. and under inert conditions (nitrogen). The working electrode was rotated at a constant frequency of 1600 rpm. To bring the sample to a defined state before the actual measurement, the potential was cycled 5 times between 50 mV and 500 mV relative to a standard hydrogen electrode at a scan rate of 20 mV/s. For the actual measurement, the electrolyte was made 1 M in methanol and the potential was increased stepwise from 50 mV to 250 mV, 300 mV, 350 mV, 400 mV, 450 mV, 500 mV and 550 mV. Each potential was maintained for 180 seconds. The current density was in each case measured before the next potential jump, i.e. 180 seconds after the preceding potential jump. The following table shows the measured current densities as a function of the potential.

TABLE 1

Current densities as a function of the potential

| Potential U, mV | 250 | 300 | 350 | 400 | 450 | 500 | 550 |
|---|---|---|---|---|---|---|---|
| Current density I, mA/mg of Pt | 0 | 6 | 21 | 51 | 98 | 161 | 237 |

As can be seen from the table, electrochemical oxidation of methanol can be observed even at a potential as low as 300 mV relative to the standard hydrogen electrode. This behavior typifies well-alloyed PtRu-comprising anode catalysts for direct methanol fuel cells.

The invention claimed is:

1. A process for producing a catalyst comprising a first metal of the platinum group and a second metal, different from the first metal, selected from among the metals of the platinum group or the transition metals, the process comprising:
   a. mixing a catalyst comprising the first metal with a complex comprising the second metal, to obtain a dry powder; and
   b. heat treating the dry powder, to form a compound between the first metal and the second metal,
   wherein the heat treating comprises a first stage, a second stage, and a third stage, and each stage is carried out at a different temperature.

2. The process according to claim 1, wherein the temperature is increased in each successive stage of the heat treatment.

3. The process of claim 2, wherein the temperature is increased linearly between the individual stages of the heat treatment.

4. The process of claim 3, wherein:
   the temperature increase from the first stage to the second stage of the heat treatment occurs in a time in the range from 20 to 60 minutes; and
   the temperature increase from the second stage to the third stage of the heat treatment occurs in a time in the range from 2 to 4 hours.

5. The process of claim 1, wherein:
   the first stage of the heat treatment is carried out at an essentially constant temperature in the range from 90 to 140° C. for a time of from 90 to 180 minutes;
   the second stage of the heat treatment is carried out at an essentially constant temperature in the range from 200 to 350° C. for a time of from 3 to 5 hours; and
   the third stage of the heat treatment is carried out at an essentially constant temperature in the range from 500 to 800° C. for a time of from 20 minutes to 4 hours.

6. The process of claim 1, wherein:
   the first stage of the heat treatment is carried out under an inert atmosphere; and
   at least one selected from the group consisting of the second and third stage of the heat treatment is carried out under a reducing atmosphere.

7. The process of claim 6, wherein the inert atmosphere is a nitrogen atmosphere and the reducing atmosphere comprises hydrogen.

8. The process of claim 6, wherein the reducing atmosphere comprises a mixture of hydrogen and nitrogen.

9. The process of claim 1, further comprising, after the heat treating (b):
   cooling to ambient temperature under an inert atmosphere.

10. The process of claim 1, wherein the first metal is platinum.

11. The process of claim 1, wherein the second metal is selected from the group consisting of ruthenium, cobalt, nickel and palladium.

12. The process of claim 1, wherein the second metal is in the form of
   a metal complex with a ligand selected from the group consisting of an olefin, an aromatic, and 2,4-pentanedione;
   a mixed cyclopentadienyl-carbonyl complex; or
   a pure or mixed carbonyl, phosphane, cyano, or isocyano complex.

13. The process of claim 1, wherein the second metal is in the form of a metal complex with a ligand selected from the group consisting of acetylacetonate or 2,4-pentanedione.

14. The process of claim 1, wherein the complex comprising the second metal is in the form of powder or a solution in a solvent.

15. The process of claim 14, wherein the solvent is selected from the group consisting of hexane, cyclohexane, toluene, and an ether compound.

16. The process of claim 1, wherein the catalyst comprising the first metal is in the form of metallic powder.

17. The process of claim 1, wherein the catalyst comprising the first metal further comprises a support.

18. The process of claim 17, wherein the support is a carbon support.

19. A catalyst produced by the process of claim 1.

20. The catalyst of claim 19, being a 3-way catalyst or a diesel oxidation catalyst in automobile exhaust gas catalysis.

* * * * *